(12) United States Patent
Gibson et al.

(10) Patent No.: US 10,055,514 B2
(45) Date of Patent: Aug. 21, 2018

(54) TOP-DOWN CAD DESIGN

(71) Applicant: Dassault Systemes SolidWorks Corporation, Waltham, MA (US)

(72) Inventors: Mark Gibson, Cambridge, MA (US); Frank Ruepp, Langenau (DE); Hyesung Lee, Westford, MA (US); Hari Padmanabhan, Waltham, MA (US)

(73) Assignee: DASSAULT SYSTEMES SOLIDWORKS CORPORATION, Waltham, MA (US)

( * ) Notice: Subject to any disclaimer, the term of this patent is extended or adjusted under 35 U.S.C. 154(b) by 784 days.

(21) Appl. No.: 14/575,839

(22) Filed: Dec. 18, 2014

(65) Prior Publication Data

US 2015/0178413 A1 Jun. 25, 2015

Related U.S. Application Data

(60) Provisional application No. 61/918,558, filed on Dec. 19, 2013.

(51) Int. Cl.
G06F 17/50 (2006.01)

(52) U.S. Cl.
CPC .......... *G06F 17/50* (2013.01); *G06F 2217/02* (2013.01); *G06F 2217/06* (2013.01)

(58) Field of Classification Search
CPC ... G06F 17/50; G06F 2217/06; G06F 2217/02
USPC .......................................... 703/1; 700/97-98
See application file for complete search history.

(56) References Cited

U.S. PATENT DOCUMENTS

| 2002/0089499 A1* | 7/2002 | Lee | G06T 17/005 345/419 |
| 2006/0277005 A1* | 12/2006 | Walker | G06F 17/50 703/1 |

OTHER PUBLICATIONS

Planchard et al. "SolidWorks 2013 Tutorial with Video Instruction"., Feb. 2013, 90 Pages.*

(Continued)

*Primary Examiner* — Eunhee Kim
(74) *Attorney, Agent, or Firm* — Hamilton, Brook, Smith & Reynolds, P.C.

(57) ABSTRACT

In one embodiment, a computer-readable medium is configured to store instructions for creating a model in a three-dimensional (3D) environment, where the model represents a real-world object. The instructions, when loaded and executed by a processor, causes the processor to, given a two-dimensional (2D) sketch comprised of sketch entities, automatically create one or more 3D part in the 3D environment corresponding to respective groupings of sketch entities. The instructions further cause the processor to create a derived layout sketch in the 3D environment associated with a first 3D part, where the derived layout sketch is a reference to or a copy of the 2D sketch, and automatically create a relationship between the first 3D part and a second 3D part where the relationship is based on a constraint between corresponding respective groupings of sketch entities.

20 Claims, 8 Drawing Sheets

(56) References Cited

OTHER PUBLICATIONS

"2012 SolidWorks Help—Top-Down Design Overview", 2 pages, dated 2012, http://help.solidworks.com/2012/English/SolidWorks/sldworks/Trop_Down_Design_Overview.htm retrieved from Internet Dec. 6, 2017.

"2012 SolidWorks Help—Assembly Layout Sketch", 2 pages, dated 2012, http://help.solidworks.com/2012/English/SolidWorks/sldworks/Assembly_Layout_Sketch.htm retrieved from Internet Dec. 6, 2017.

* cited by examiner

TOP-DOWN CAD DESIGN

RELATED APPLICATION(S)

This application claims the benefit of U.S. Provisional Application No. 61/918,558, filed on Dec. 19, 2013. The entire teachings of the above application(s) are incorporated herein by reference.

BACKGROUND

Computer-aided design (CAD) software allows a user to construct and manipulate complex three-dimensional (3D) models. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to topological faces bounded by edges. Wire-frame modeling techniques, on the other hand, can be used to represent a model as a collection of simple two-dimensional (2D) or 3D lines, whereas surface modeling can be used to represent a model as a collection of exterior surfaces. CAD systems may combine these and other modeling techniques, such as parametric modeling techniques. Parametric modeling techniques can be used to define various parameters for different features and components of a model, and to define relationships between those features and components based on relationships between the various parameters.

CAD systems may also support two-dimensional (2D) objects that are 2D representations of 3D objects. Two- and three-dimensional objects are useful during different stages of a design process. Three-dimensional representations of a model are commonly used to visualize a model in a physical context because the designer can manipulate the model in 3D space and can visualize the model from any conceivable viewpoint. Two-dimensional representations of a model are commonly used to outline a top-level model design and prepare and formally document the design of a model.

A design engineer is a typical user of a 3D CAD system. The design engineer designs physical and aesthetic aspects of 3D models, and is skilled in 3D modeling techniques. Using a 3D CAD system, the design engineer creates part models and may assemble the parts into a model of a subassembly. A subassembly may also consist of other subassemblies. An assembly is designed using parts and subassemblies. Parts and subassemblies are hereinafter collectively referred to as components.

Design engineers may choose to create an assembly using a top-down design method, whereby one or more features of a part are defined by an object in an assembly, such as a layout sketch or the geometry of another part. The design intent (e.g., sizes of features, placement of components in an assembly, and proximity of parts to one another) originates from a top-level design of an assembly for example, and permeates downward (e.g., into the parts and the features making up the parts), hence the phrase "top-down design."

A layout sketch is one or more 2D sketches that capture the design intent of a model by showing the components of the model and the positions of those components with respect to one another, and typically is created before creating 3D parts. Moreover, often the layout sketch is created by one person and the 3D parts by another person, and, if the layout sketch and 3D parts are not harmonized (whether created by the same or different designers), the assembly will no longer represent the design intent reflected in the layout sketch.

In prior implementations of a layout sketch workflow, all of a 3D part's geometry (and the corresponding 2D geometry in a layout sketch) may be located a substantial distance from the 3D part's (or layout sketch) origin; moreover, due to the orientation of the 3D part geometry with respect to the 3D part's origin, the 3D part may appear to be rotated about an arbitrary axis when viewed in the industry standard "front," "top," or "right" views. Such placements and orientations with respect to a non-optimal origin can increase the difficulty of modeling a 3D part because the origin serves as a convenient reference and subsequent translations and rotations applied to the 3D part may be computed with respect to the non-optimal origin. Ideally, the origin of a part's local coordinate system should be at a point on the part about which the part is meant to rotate (e.g., the geometric center of the part), if the part is intended to rotate. Placement of the origin is important to the symmetry of a part and to mating relationships that allow a part to slide, rotate, or be fixed in place. Additionally, the origins and orientations of the parts may cause results of some mass properties calculations to be difficult for the design engineer to interpret if the origins of the various local coordinate systems of the parts are located at some distance and/or oriented in an arbitrary way from their respective parts.

A design engineer may desire to use a layout sketch or portion thereof as a guide to the creation of a 3D part. Generally in current state-of-the-art CAD systems, when converting a layout sketch to one or more 3D parts, the design engineer performs the steps necessary to mate (i.e., to create a relationship between) the origins of the parts that make up the assembly or subassembly to correctly place the 3D parts therein. More specifically, the origins of each of the 3D parts is mated to the origin of the assembly However, the 3D parts then cannot move relative to each other because each 3D part has an element constrained to the same origin, which prevents motion visualization and analysis studies to be properly carried out. The design engineer can choose to manually mate the 3D parts in the 3D assembly using part geometry to capture the desired motion degrees of freedom, however, this takes additional time and the mating constraint is prone to fail in the future if geometry of one or both of the mated parts changes, requiring the design engineer to modify one or more constraints, the design, or both, thereby needing to spend even more time designing the assembly.

Further, if the design engineer created a motion visualization or motion analysis study in the 2D environment and desires a similar motion visualization or motion analysis study in the 3D environment, the design engineer typically must create, from the beginning, the motion visualization or motion analysis study again in the 3D environment.

In general, in current state-of-the-art CAD systems, the design engineer creates 3D parts, adds a copy of the layout sketch into each part, inserts the parts into an assembly, and mates the origins of the parts together, thereby attempting to replicate the constraints of the layout sketch, which prevents proper motion of the 3D parts as described. The length of time necessary to convert a 2D layout sketch to a 3D assembly of parts is based on the number of constraints that need to be established, the number of different steps in the conversion process (which may be determined by the number of mouse clicks), the origins of the various parts and the calculations thereof, the complexity of the 2D layout sketch, and the desired 3D assembly to be created. This process can be tedious for a design engineer to perform since such assemblies can have hundreds if not thousands of parts. Automating these tasks would have time-saving advantages, including the advantage of designing an assembly using a layout sketch where changes to the layout sketch cause automatic updates to the assembly and assembly components.

Therefore, to increase productivity, current state-of-the-art CAD systems would benefit from a system and method for providing an automated work flow for creating 3D part models in a 3D environment from a 2D layout sketch. Automatically creating relationships between the 3D part models similar to those that exist in the 2D layout sketch and providing a means to automatically create 3D parts from a 2D layout sketch would reduce the amount of time spent and effort expended by a design engineer to use already created 2D content to create 3D content and thereby enhance the capabilities of a computerized modeling system.

SUMMARY

In one embodiment, a computer-readable medium is configured to store instructions for creating a model in a three-dimensional (3D) environment where the model represents a real-world object. The instructions, when loaded and executed by a processor, can cause the processor to, given a two-dimensional (2D) sketch that contains sketch entities, automatically create one or more 3D parts corresponding to respective groupings of sketch entities. The instructions can further cause the processor to create a derived layout sketch in the 3D environment associated with a first 3D part; the derived layout sketch may be a reference to and a copy of the 2D sketch. The instructions can additionally cause the processor to automatically create a mate relationship between a first part model and a second part model each in the assembly of parts. The mate relationship can be based on a relationship between the corresponding groupings of sketch entities.

Other aspects of the present invention include one of the respective groupings of sketch entities consisting of a series of sketch entities that create a closed contour, an arrangement of continuous lines, or a collection specified by a user. Further aspects include the creation of the relationship not relying on the first 3D part geometry and the second 3D part geometry, the creation of the relationship being a mapping of a constraint between two of the sketch entities to a mate relationship, and the derived layout sketch establishing a parametric relationship between the first 3D part and the 2D sketch. In an embodiment, the mapping of the constraints is a coincident constraint between two points to a coincident mate between two axes, a constraint between two parallel lines to a parallel mate between two planes, a constraint between two perpendicular lines to a perpendicular mate between two planes, a distant constraint between two lines to a distance mate between two planes, an angular dimension constraint between two lines to an angle mate between two planes, a tangent constraint to a tangential mate, or a concentric constraint to a concentric mate.

Additionally, an embodiment includes instructions that further cause the processor to automatically include a 3D motion study from a 2D motion study established in a 2D environment. The instructions can additionally cause the processor to automatically determine an origin for a first 3D part coincident with the corresponding groupings of sketch entities.

Other embodiments include a computer-implemented method of creating a model in a 3D environment comprised of, given a 2D sketch of an assembly of parts, automatically creating one or more 3D part models corresponding to respective groupings of sketch entities, constructing a derived layout sketch and including the derived layout sketch in a first 3D part model, and automatically creating a mate relationship between the first 3D part model and a second 3D part model where the mate relationship is based on a constraint between a first 2D object in the 2D sketch and a second 2D object in the 2D sketch. The derived layout sketch is a reference between the first 3D part model or the 2D sketch and a copy of the 2D sketch inserted into the 3D environment in which the first 3D part model is being constructed.

Further aspects of embodiments include at least one of the groupings of sketch entities consisting of a series of sketch entities that create a closed contour, an arrangement of continuous lines, or a collection specified by a user, creation of the relationship being a mapping to a mate relationship of a constraint between a first 2D object in the 2D sketch and a second 2D object in the 2D sketch, and the mapping being a coincident constraint between two points to a coincident constraint between two axes, a constraint between two parallel lines to a parallel mate between two planes, a constraint between two perpendicular lines to a perpendicular mate between two planes, a distance constraint between two lines to a distance mate between two planes, an angular dimension constraint between two lines to an angle mate between two planes, a tangent constraint to a tangential mate, or a concentric constraint to a concentric mate.

Embodiments also include the derived layout sketch establishing a parametric relationship between the first 3D part model and the 2D sketch, automatically including a motion study established in the 2D sketch in the 3D environment, where including the motion study creates one or more motion study objects in the 3D environment and each motion study object has a specification similar to a corresponding motion object in the 2D layout sketch. Embodiments may also include automatically determining an origin for the 3D part model and a coincident origin for a respective grouping of sketch entities for the 3D part model.

In another embodiment, a computer system for transforming a 2D sketch representing a real-world assembly of parts to a 3D assembly of 3D parts. The system comprising a part creation module configured to automatically create a 3D part corresponding to a respective grouping of 2D entities in the 2D sketch and a mate creation module configured to automatically create a mate relationship between a first 3D part and a second 3D part created by the part creation module. To automatically create the mate relationship, a mapping to a mate relationship is performed from a constraint between two of the respective grouping of 2D entities. The mapping is a coincident constraint between two points to a coincident constraint between two axes, a constraint between two parallel lines to a parallel mate between two planes, a constraint between two perpendicular lines to a perpendicular mate between two planes, a distant constraint between two lines to a distance mate between two planes, an angular dimension constraint between two lines to an angle mate between two planes, a tangent constraint to a tangential mate, or a concentric constraint to a concentric mate. Furthermore, association between the first 3D part model and a derived sketch establishes a parametric relationship between the first 3D part model and the 2D sketch. The computer system may also include a motion study module automatically configured to create a motion study to visualize a motion in the 3D assembly, where the mate relationship determines the motion.

BRIEF DESCRIPTION OF THE DRAWINGS

The foregoing will be apparent from the following more particular description of example embodiments of the invention, as illustrated in the accompanying drawings in which like reference characters refer to the same objects throughout the different views. The drawings are not necessarily to scale, emphasis instead being placed upon illustrating embodiments of the present invention.

DETAILED DESCRIPTION

Figure 1:
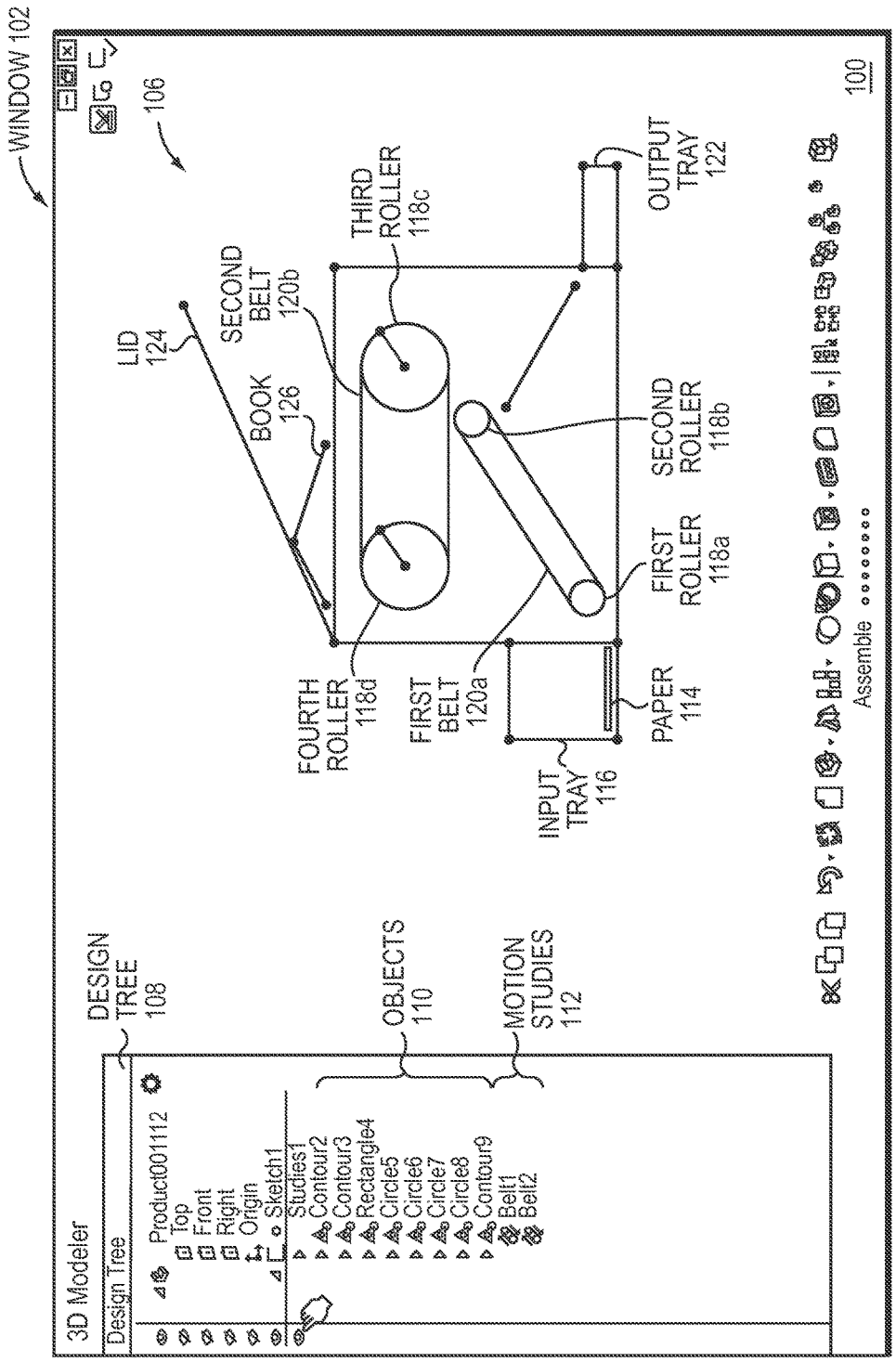
FIG. 1 is an illustration of a two-dimensional (2D) layout sketch displayed in a window.

A description of example embodiments of the invention follows.

The present invention enables a design engineer to employ a top-down design workflow in a computer-aided design (CAD) system beginning with a layout sketch of a subassembly or an assembly. In a top-down design workflow, 3D parts are designed in the assembly environment. To contrast, in a bottom-up design workflow, each part of an assembly is designed separately, and then inserted into the assembly.

The present invention automates the creation of 3D parts with references to layout sketch entities, or copies thereof, thereby saving the design engineer time during the product design phase. In the layout sketch, one or more entities are used as the basis of a 3D part (the layout entities used as the basis hereinafter referred to as a 2D object). When creating a new 3D part, the present invention automatically chooses a location for the origin of the new 3D part relative to the elements that comprise the 3D part. Furthermore, the 3D part may be given a local origin, which the design engineer may adjust manually.

A design engineer may create layout sketches to quickly analyze or evaluate several design concepts without having to create construction geometry, and solid and surface geometry for each, or any, of the parts. A layout sketch is a simplified view of an assembly (e.g., a top or front view) and contains sketch entities that represent real-world parts in the assembly. For example, a layout sketch of a copier machine may include a circle that represents a roller unit and a trapezoid that represents a hopper unit. The design engineer uses a CAD system to draw elements of the layout sketch, including the circle and lines of the trapezoid. The design engineer may draw the layout sketch using a mouse or other cursor-controlled pointing device, using a keyboard, by specifying dimensions for various shapes (e.g., circles, lines, rectangles, ellipses), or any combination thereof. Additionally, the design engineer may draw the layout sketch freehand using pencil and paper, then scan the freehand sketch and import the freehand sketch into the CAD system. Software can then determine the shapes on the freehand sketch and convert the shapes to a digital format thereby producing the 2D layout sketch. The design engineer may also use a device such as a digital drawing tablet to enter data representing a layout sketch into the CAD system.

Construction geometry is used to assist in creating layout sketch entities and geometry that are ultimately incorporated into a 3D part, for instance, by assisting the design engineer with aligning layout sketch entities. Construction geometry is ignored when the layout sketch is used to create a 3D part. As an example, in a subassembly for a hopper unit in a copier machine, the positions and lengths of lines representing the hopper unit can be laid out in the layout sketch with construction geometry thereby aiding the design engineer in establishing angles and lengths of the lines.

Once a layout sketch is complete, the 3D parts are modeled to match the shape and size of associated layout sketch entities. This may include importing a copy of the layout sketch into each new 3D part, or linking a copy of the layout sketch to the new 3D part (e.g., including a derived sketch in the 3D part). Including a copy or a link to the layout sketch in each 3D part aids the design engineer in completing the design of the 3D part. Further, in some embodiments the copy or link to the copy may only show the layout sketch entities associated with the 3D part. The present invention then creates a relationship between the 3D part and corresponding layout sketch entities when creating the 3D geometry for the 3D part, for instance, by creating data constructs (e.g., pointers) that reference a particular layout sketch entity from the 3D part. The relationship between the 3D part and a 2D layout sketch entity may be a parametric relationship, such that a change to a property (e.g., a dimension), in the layout sketch appropriately changes a corresponding property of the 3D part. For instance, in the copier example, a circle in a layout sketch may be used to create a 3D part of a roller unit. The circle entity in the layout sketch that represents the roller may not be directly used to model the 3D part; however, the property that specifies the diameter of the circle may be used to create the 3D part. If the circle in the layout sketch is made larger or smaller, the layout sketch associated with each part likewise adjusts the circle by virtue of there being a link mechanism (e.g., a pointer from the layout sketch in the 2D environment to the copy of the layout sketch in the 3D environment), and the corresponding 3D part also updates accordingly. Thus, shapes and sizes of the 3D parts may be controlled by the corresponding entities in the layout sketch.

From each 2D object in the layout sketch, the present invention automatically creates a 3D part and includes the 3D part in a 3D assembly. In an embodiment of the present invention the layout sketch, 3D parts, and assembly comprised of the 3D parts are tightly integrated in one digital document or file. This is in contrast to a typical CAD system where the design engineer must insert all of the 3D parts into a new 3D assembly. The present invention automatically creates 3D parts using multiple methods. One method searches for closed contours in the layout sketch and creates a 3D part for each closed contour. Examples of closed contours are circles and 2D rectangular objects. Another method used to automatically create a 3D part analyzes endpoints of sketch entities and determines whether lines are continuous. The continuous lines are then converted to a 3D part. Another method allows a design engineer to select a set of 2D entities and command the system to create a 3D part from the selected 2D entities.

After the conversion of the layout sketch entities to 3D part entities, copies of or pointers to a 2D layout sketch, and a number of 3D part files exist in the 3D assembly environment. The design engineer may then initiate an automatic mating operation so that each 3D part origin is constrained to the origin of the assembly, which positions the 3D parts in their proper locations relative to the orientation of the 2D layout sketch (e.g., relative to an x-axis and y-axis of the 2D layout sketch). Thus, the design engineer does not have to manually move each 3D part to reflect the proper orientation with respect to the 2D layout sketch. Moreover, changes to the positions of the 2D layout sketch entities affects the location of the 3D parts. Further, changes to the shape and/or size of each layout sketch entity affects the shape and/or size of corresponding 3D part entities in the 3D assembly. Thus, changes to the 2D layout sketch entities affect corresponding 3D part entities in the 3D assembly. Therefore, the layout sketch workflow described herein is a top-down solution as changes to the 2D layout sketch representing an assembly of parts affect changes to the corresponding 3D parts and corresponding features and properties thereof.

The present invention automatically creates mates (also referred to herein as mate relationships and mating relationships), between the newly created 3D parts or features thereof. The automatically created mates reproduce in a 3D environment the geometric relationships between entities in a 2D layout sketch, which is accomplished via a mapping between 2D entities in the 2D layout sketch and corresponding 3D entities without relying on 3D part geometry. Relying on 3D part geometry presents problems because the 3D geometry can change during later phases of the design process and as a result cause failures that misalign mated features, misplace 3D parts, or stop constraining the once-mated parts. For example, if a layout sketch relationship reproduced as a mating relationship relied on 3D part geometry and the design engineer chose to convert the 3D assembly containing the 3D part back to a layout sketch, the layout sketch relationship may be lost during the conversion process because the layout sketch relationship may be associated with 3D part geometry that does not transfer back to the layout sketch. By creating a relationship between the 3D parts without relying on the 3D part geometry but rather performing a mapping between 2D entities and corresponding 3D entities, the present invention can transfer the mating relationships back to the layout sketch without failure.

Automatically creating mates allows motion in the 3D assembly of a 3D part and other parts that may move as a result similar to the motion in the layout sketch of the 2D representations of the corresponding 3D parts. Automatically creating mates also allows realistic motion simulation of the 3D assembly before all 3D parts are constructed because the design engineer can view the motion in the 2D layout sketch, which represents the motion of the eventually constructed 3D parts.

Referring now to FIG. 1, a window 102 displayed on a computer monitor is shown. The window 102 is generated by modeling software executed by a computerized modeling system, an example of which is later shown with reference to FIG. 7. The window 102 is a conventional computer-generated window that can be programmed by one of ordinary skill in the art using conventional, commercially available, software programming tools, such as those available from Microsoft Corporation of Redmond, Wash.

A 2D layout sketch 106 in the window 102 contains 2D objects representing a copier machine, including 2D paper 114, a 2D input tray 116, 2D rollers 118a-d, 2D belts 120a-b, 2D output tray 122, and 2D lid 124. A 2D book 126 lies beneath the 2D lid 124. Implementations also may include other window areas, such as a design tree 108 in which the structure of 2D layout sketch 106 is shown to help the design engineer understand the 2D objects that comprise the 2D layout sketch 106.

Relationships between 2D sketch entities are an important means of incorporating design intent in a model. Such relationships may be established by defining sketch constraints, each which defines a geometric relationship between two sketch entities. For example, the design engineer may establish a relationship between the first 2D roller 118a and the first 2D belt 120a by defining a constraint between the center of the first 2D roller 118a and the center of the semicircle at the corresponding end of the first 2D belt 120a.

Figure 2:
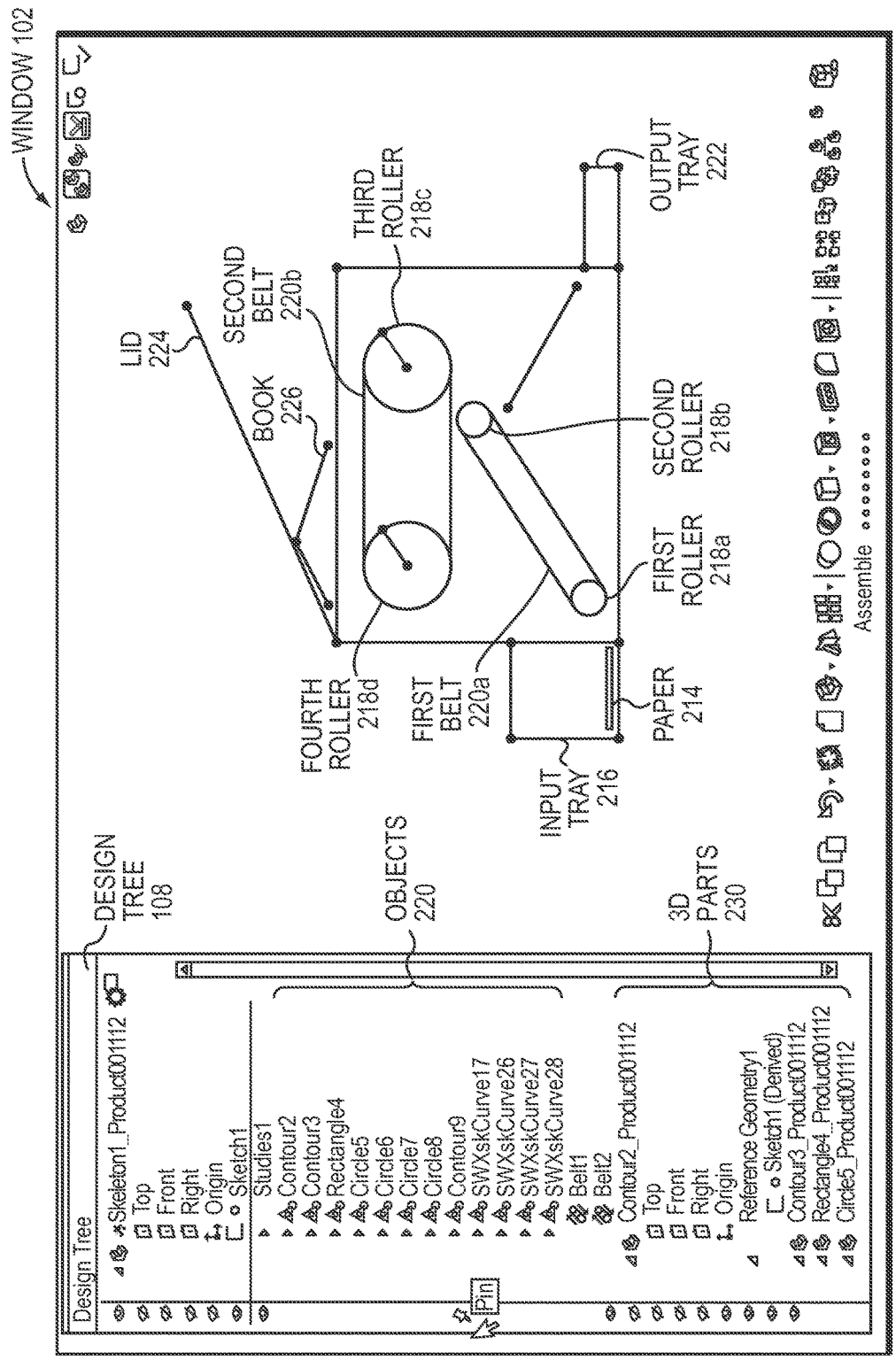
FIG. 2 is an illustration of 3D parts corresponding to objects in FIG. 1.

Referring now to FIG. 2, window 102 containing 3D parts 216-224 is shown. The 3D parts 216-224 were created from 2D objects 116-124 illustrated in FIG. 1. The 3D parts 216-224 in the window 102 are a 3D input tray 216, 3D rollers 218a-d, 3D belts 220a-b, a 3D output tray 222, and a 3D lid 224. Also depicted in FIG. 2 is 3D paper 214 and a 3D book 226. The window 102 further includes the design tree 108 which includes a list of 3D objects 220, corresponding to 3D objects represented in the window. The design tree 108 also has entries for the sketch, one of which is indicated as derived.

The present invention generates 3D parts 216-224 from the 2D sketch layout shown in FIG. 1 after the design engineer initiates a command to convert the layout sketch to 3D components. The present invention can convert all 2D objects of the layout sketch of FIG. 1 to 3D components (e.g., solid models), or the design engineer can select (using a cursor-controlled device, for example) one or more 2D objects in the 2D layout sketch to convert to 3D objects. After the present invention converts the 2D objects to 3D components, the 3D components may still be flat, until the design engineer specifies depth for the 3D components by initiating an extrude or sweep operation, for example.

Figure 3:
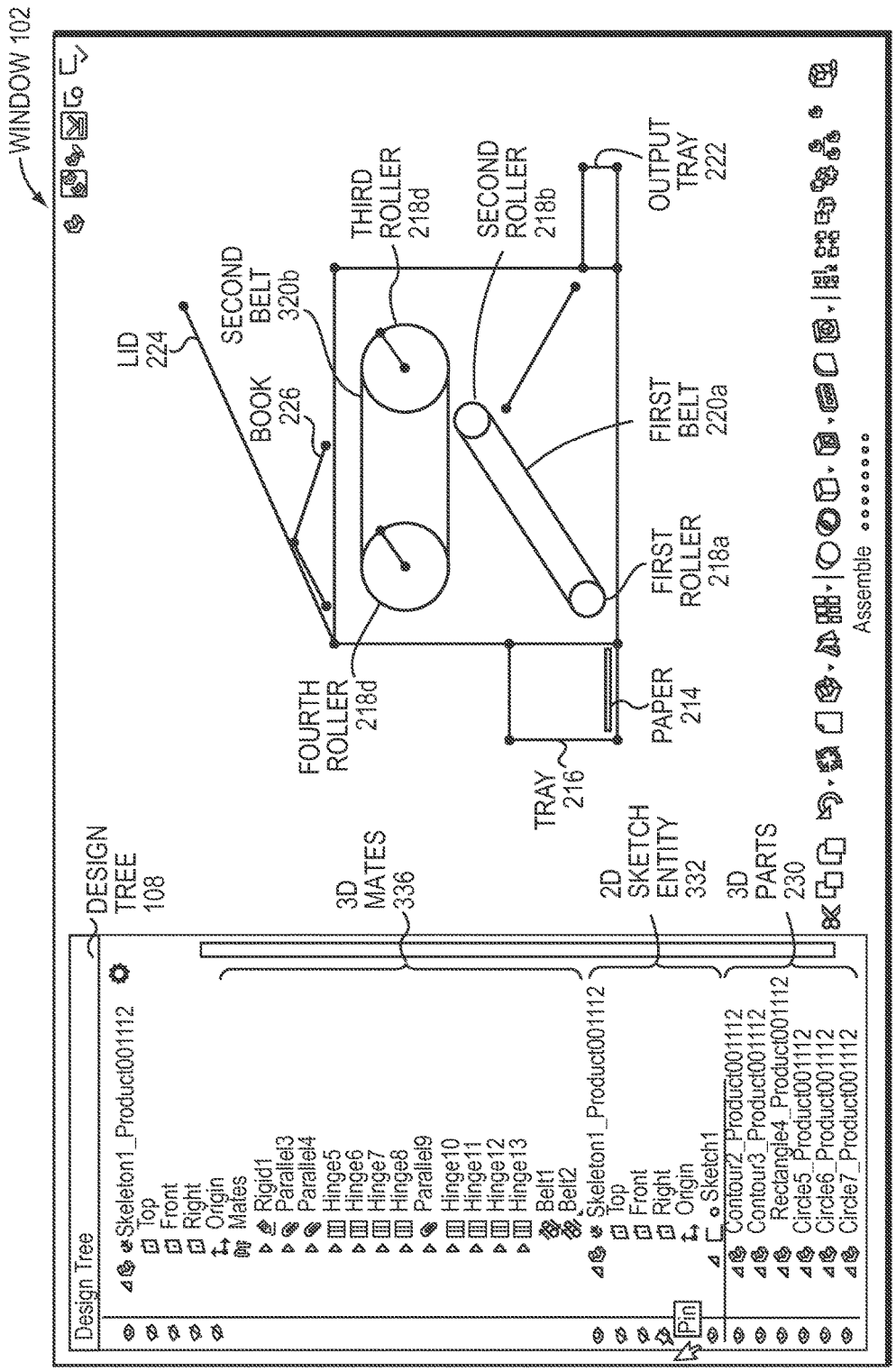
FIG. 3 is an illustration of 3D parts corresponding to objects in FIG. 1.

Referring now to FIG. 3, the window 102 containing 3D parts 216-224 is shown. The 3D parts 216-224 may be solid models. The design tree 108 shows 2D sketch entities 332, which include the 2D objects of the 2D layout sketch. The design tree 108 also contains icons representing 3D mates 336, including representations of parallel mates, hinge mates (which define relationships such that an object pivots with respect to another object), and belt mates (which define relationships such that an object may move along a closed contour). When converting the 2D objects in the 2D layout sketch to 3D parts in a 3D assembly, the sketch constraints between 2D objects are reproduced as mates in the corresponding 3D parts. In an example embodiment of the present invention, converting a 2D layout sketch to a 3D assembly may include creating an axis of a 3D part that is perpendicular to a plane, where the axis corresponds to a center point of a circle in a 2D layout sketch and the plane corresponds to a plane on which the circle in the 2D sketch is drawn.

Figure 4A:
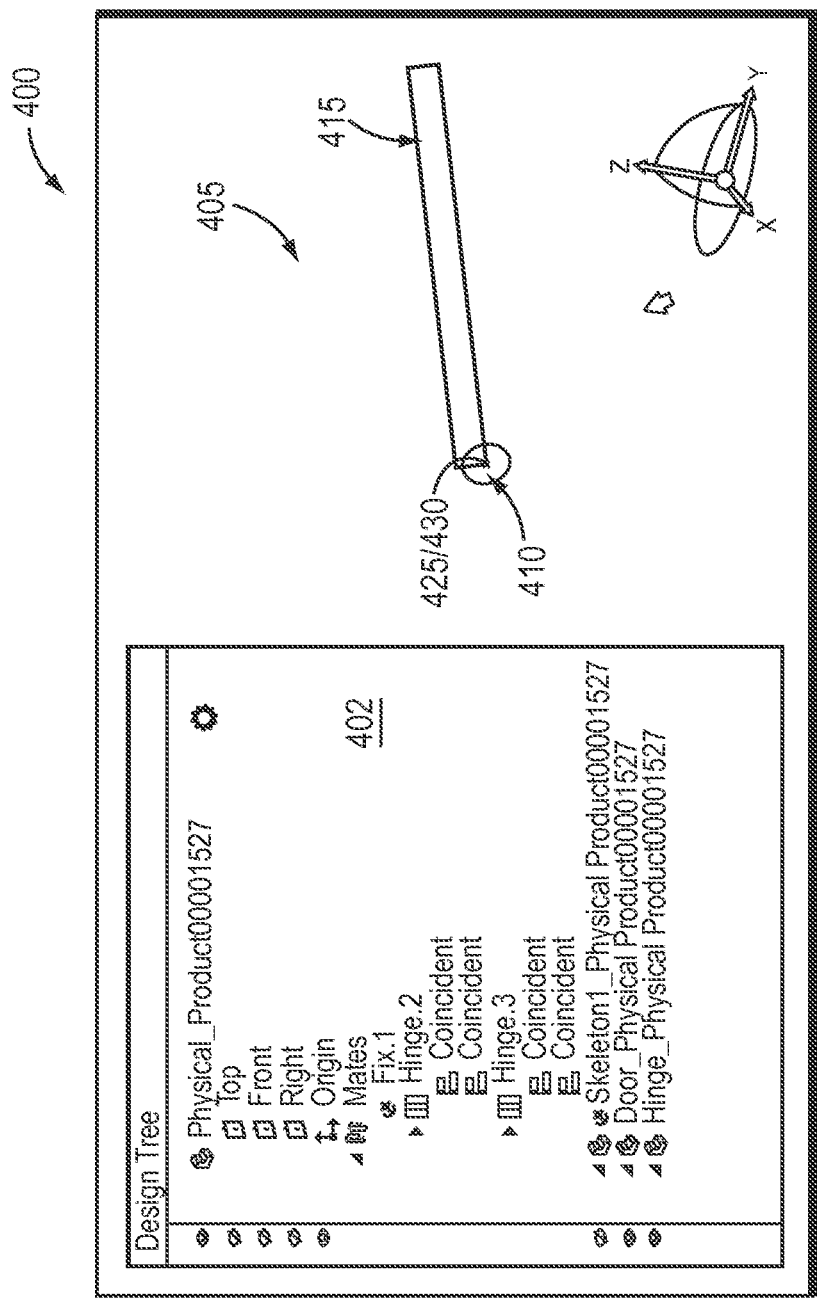
FIG. 4A is an illustration of a window containing 3D parts.
Figure 4B:
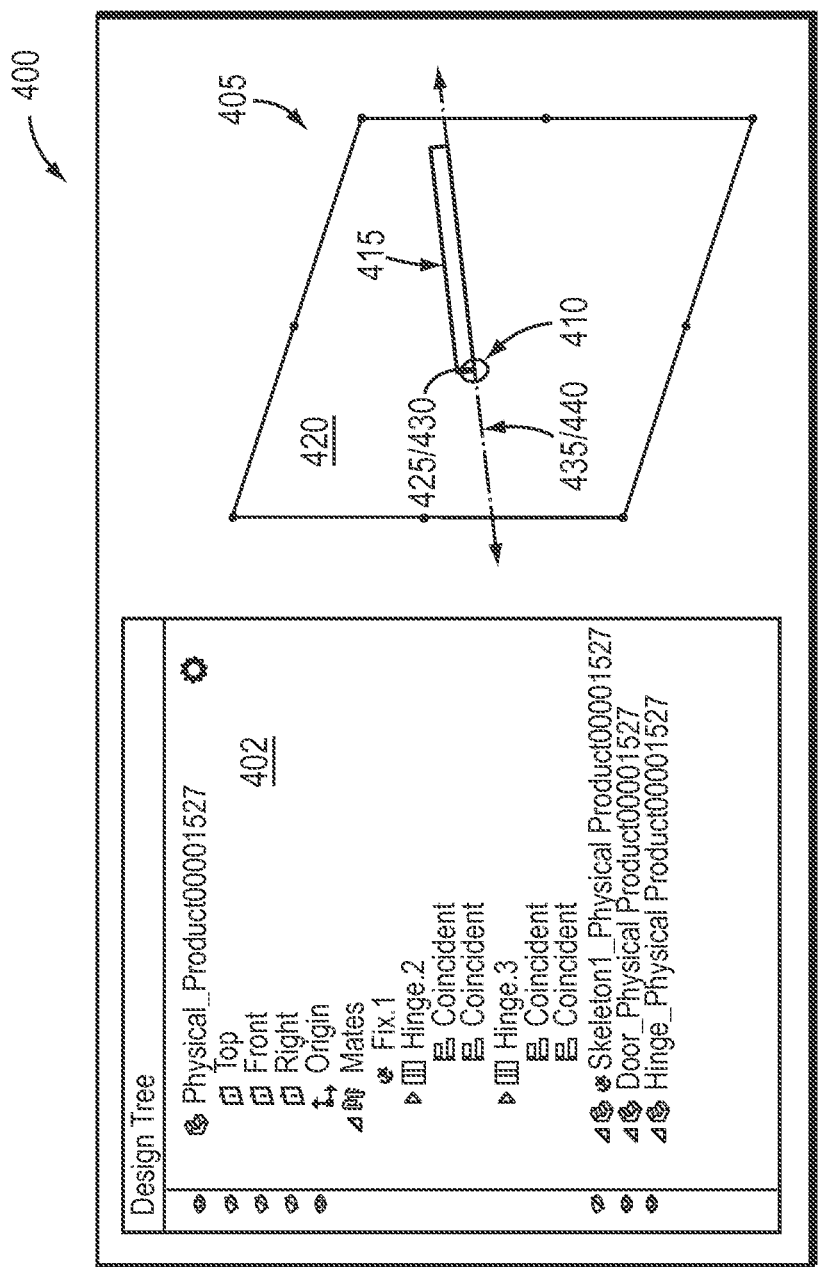
FIG. 4B is an illustration of a window containing 3D parts.

FIGS. 4A and 4B illustrate an example of an axis of a 3D part corresponding to a center point of a circle. In FIG. 4A, a window 400 contains a design tree 402 and an assembly 405. The assembly 405 contains a circular part 410, and a rectangular part 415. The circular part 410 represents a hinge and the rectangular part 415 represents a door as viewed from the top looking downward. A circular 2D object in a layout sketch corresponds to the circular part 410 and a rectangular 2D object in the layout sketch corresponds to the rectangular part 415. Moreover, a coincident constraint between a point in the center of the circular 2D object and a corner of the rectangular 2D object is reproduced as a coincident mate relationship in the 3D environment enabling the rectangular part 415 to pivot in a hinge-like fashion about a point 425 in the circular part 410.

In FIG. 4B, the assembly 405 has been rotated and a plane 420, on which the circular part 410 and a rectangular part 415 lie, aids in a perspective view. The circular part 410 has a corresponding circular entity in a 2D layout sketch. The center point of the circular entity has a corresponding axis 435 in the 3D environment, which extends perpendicular to the plane 420 on which the circular part 410 lies. The rectangular part 415 has a coincident axis 440, which also extends perpendicular to the plane 420 through a point 430 corresponding to the corner point of the rectangular 2D object in the 2D layout sketch that has a coincident constraint with the center point of the circular entity in the 2D layout sketch.

Figure 5:
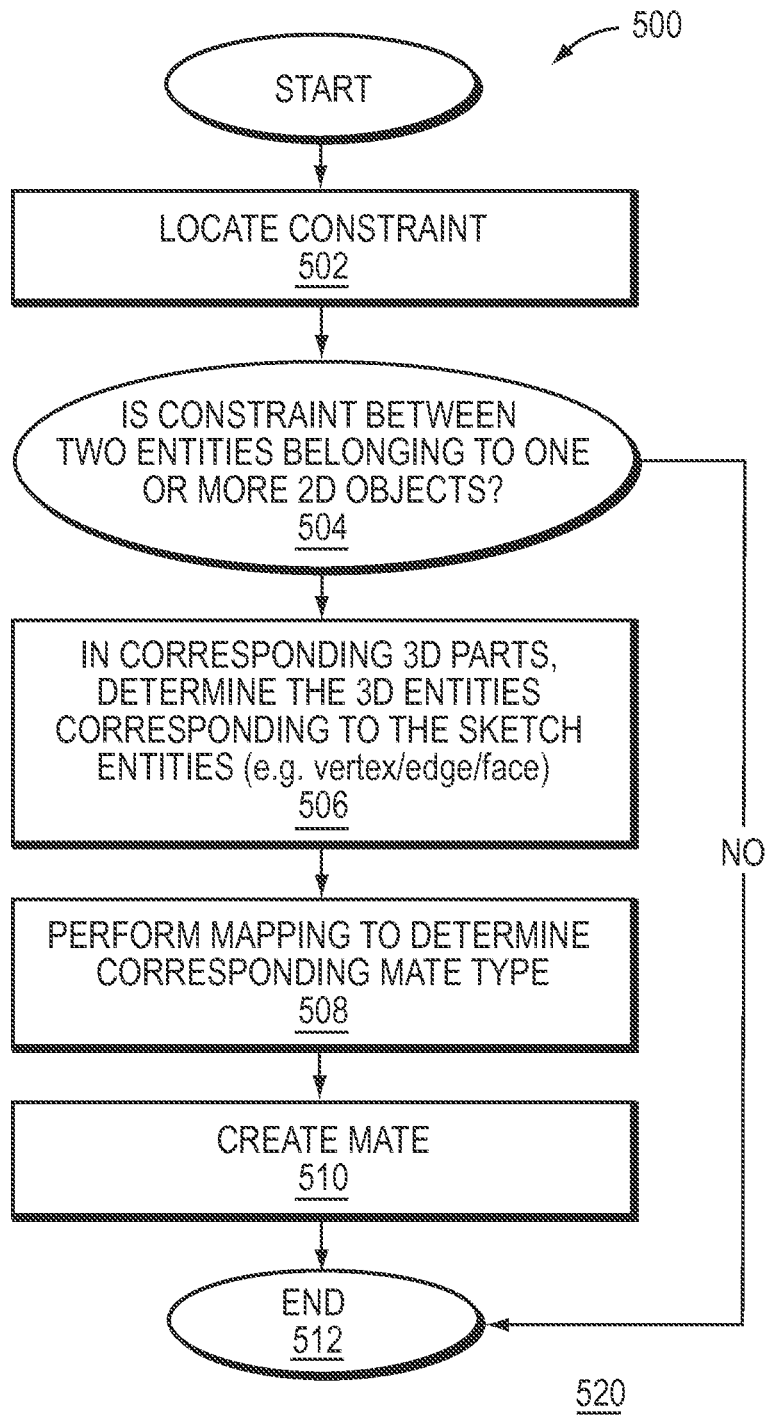
FIG. 5 is a flow diagram illustrating a process that generates a mate.

FIG. 5 illustrates an example embodiment of a process 500 that generates a mate when converting a 2D layout sketch to a 3D assembly. In the first step, process 500 locates a constraint in the 2D layout sketch (step 502). Process 500 then determines whether the layout sketch constraint is a two-entity type constraint (step 504). A two-entity constraint is a constraint between two sketch entities or a sketch entity and a reference plane, both generated manually by the design engineer; whereas a one-entity constraint is created automatically and is internal to the entity, for example, to anchor a point of the entity to the 2D layout sketch in a fixed position and thereby prevent the entity from moving in any direction. If the constraint is not between two entities belonging to 2D objects, that is, the constraint is between a sketch entity and a reference plane or is a one-entity constraint, process 500 ends (step 512).

In the next step, process 500 analyzes the new 3D parts and determines which 3D entities correspond to the two constrained entities belonging to the 2D objects (step 506). The 3D entities may be topological vertices, edges, or faces, or the 3D entities may be the associated geometry, that is, points, lines, or surfaces. A mapping then occurs to determine a corresponding mate type for the 3D entities that correspond to the two constrained entities (step 508). Process 500 then creates a mate between the 3D entities in the new 3D parts, where the type of mate is compatible with the type of constraint in the 2D layout sketch (step 510). Process 500 then ends (step 512).

As discussed, the present invention creates mates, which are relationships between parts or features thereof, from 2D layout sketch relationships according to a mapping. One such mapping produces a coincident mate between an axis extending from a first point and an axis extending from a second point in the 3D environment from a coincident relationship between a corresponding first point and second point in a 2D layout sketch, as described with reference to FIGS. 4A and 4B.

Another mapping creates a coincident mate relationship in the 3D environment from a constrained 2D point on a 2D line in a 2D layout sketch. The coincident mate is between an axis extending from a 3D point that corresponds to the 2D point and a plane in the 3D environment corresponding to the 2D line. Yet another mapping reproduces a 2D layout sketch constraint between two parallel lines as a parallel mate relationship between two planes in a 3D environment that correspond to the two parallel lines. Likewise, a layout sketch constraint between two perpendicular lines becomes a perpendicular mate relationship between two planes in a 3D environment that correspond to the two perpendicular lines in the layout sketch. Other mappings for creating mate relationships include creating a distance mate between two planes in a 3D environment that correspond to two lines in a 2D layout sketch having a distance constraint, creating an angle mate between two planes that correspond to two lines in a 2D layout sketch constrained by an angular dimension, and creating a tangential mate between two circles or a circle and a line in a 3D assembly if a tangent constraint exists between corresponding entities in a 2D layout sketch and the constraint has a "slide" property allowing an entity to freely translate. Further mappings include a concentric constraint between two circles in a 2D layout sketch mapping to a concentric mate in a 3D assembly, and a fixed constraint between two entities in a 2D layout sketch mapping to a fixed constraint between corresponding 3D entities in a 3D environment.

The present invention can create mate relationships for other types of constraints or different types of constraints as well. For example, when the present invention discovers a mirror constraint in a 2D layout sketch, only the source object is used to create new corresponding 3D entities; then in the 3D environment the new 3D entities are mirrored about a plane corresponding to the position of the line that effectuates the 2D mirror operation.

The present invention also seamlessly reproduces motion studies created in a 2D environment in a 3D environment. A motion study is a graphical simulation of motion exhibited by a CAD model that reflects the motion of a real-world object the CAD model represents. In the 2D environment when the motion study is running, the 2D objects in the layout sketch, including single lines, are treated as rigid objects and thereby enable the 2D objects to move with respect to one another. The motion study is created to analyze the movement of 2D objects in the 2D environment. The 2D objects may be manipulated so the design engineer may analyze the motion of the mechanism shown in the 2D environment. The design engineer can select a 2D object, and for example, drag the 2D object using a cursor-controlled input device or attach a motor object to the 2D object, which in turn causes other 2D objects directly or indirectly constrained to the 2D object being moved.

Creating a 3D motion study includes creating motion study objects in the 3D assembly environment, where the motion study objects have the same specifications as the motion objects in the 2D layout sketch. Such motion study objects include motors, springs, dampers, forces, contacts, constraints, and any combination thereof. Specifications of these motion study objects and corresponding 2D layout sketch counterparts include the type of motion study, the direction of movement or rotation of the motion, and the speed of movement or rotation.

Figure 6:
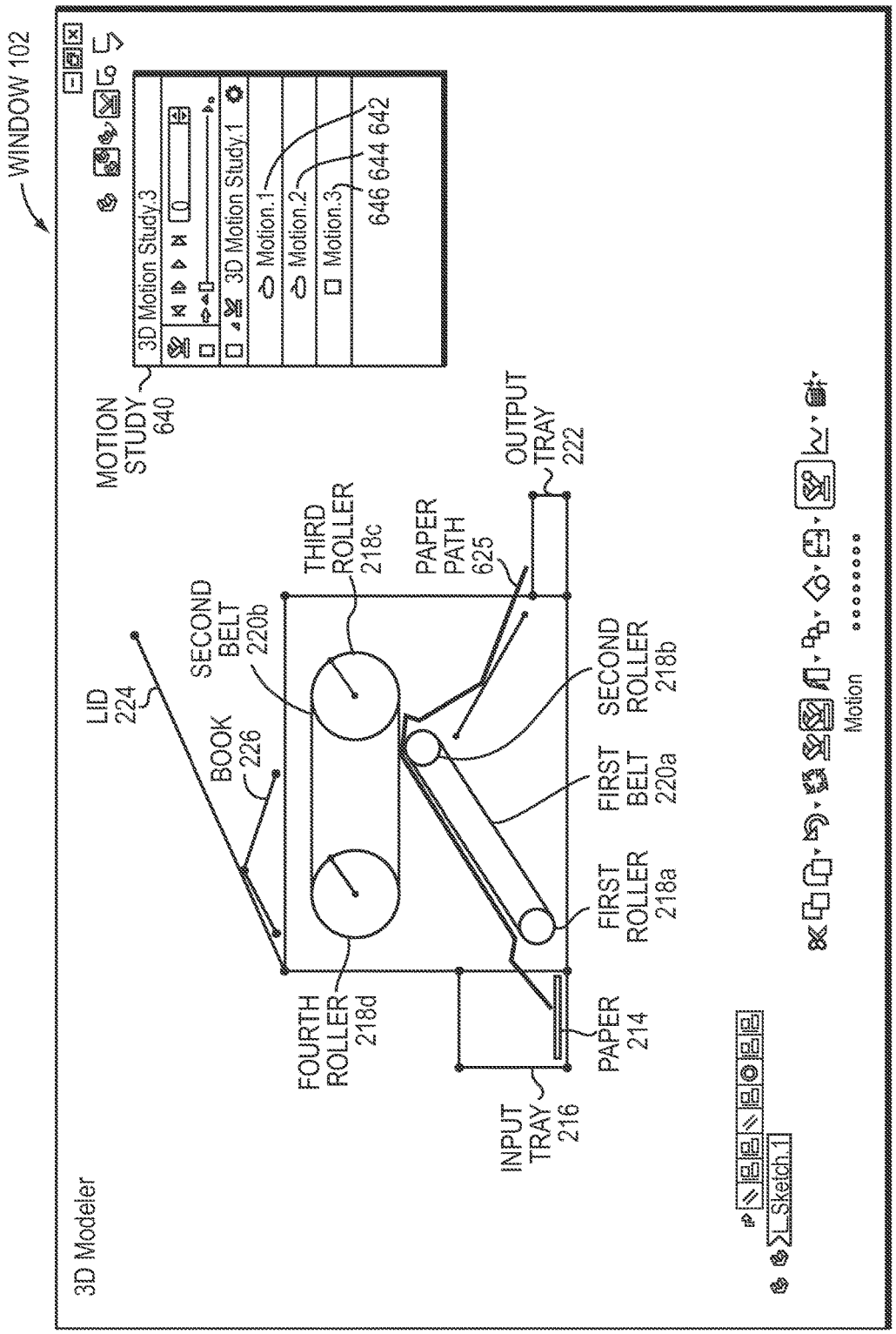
FIG. 6 is an illustration of a window containing 3D parts and a motion study user interface.

The present invention identifies one or more 2D motion studies established in a 2D layout sketch environment and from those 2D motion studies automatically creates corresponding 3D motion studies in the 3D environment, taking into account the 3D mating relationships that were created from the 2D constraints in the 2D layout sketch. In the prior art, a design engineer must manually re-create the 3D motion study; whereas, the present invention creates a 3D motion study from the 2D motion study without user required intervention. For example, the present invention creates mating relationships from 2D constraints, as discussed, and the parts in the 3D motion studies behave similarly to the corresponding 2D objects in the 2D motion studies. Referring now to FIG. 6, the window 102 in which 3D parts 216-224 are displayed is shown. The window 102 also contains a user interface 640 with information about a 3D motion study. For example, a first motion definition 642 may be based on a first motor driving first roller 218*a* and/or second roller 218*b*. The first belt 220*a* may be mated to both first roller 218*a* and second roller 218*b*, and thereby the first belt 220*a* rotates in a circular pattern corresponding to the rotation of the first motor.

As another example, a second motion definition 644 may be based on a second motor driving third roller 218*c* and/or fourth roller 218*d*. The second belt 220*b* may be mated to both the third roller 218*c* and fourth roller 218*d*, and thereby, rotates in a circular pattern corresponding to the rotation of the second motor. As a further example, a third motion 646 definition may be a trace-path motion to simulate the 3D paper 214 object traveling along paper path 625 to the 3D output tray 222. The trace-path motion may be created automatically from a of a 2D trace path in the 2D layout sketch and then replicated in the 3D environment.

The present invention also manages the coordinate systems of the converted 3D parts. Multiple 3D objects are created from a layout sketch and each 3D object is given a local origin. The default local origin is determined heuristically; however, the design engineer may adjust the origin manually. As discussed, in a new 3D part, the layout sketch is copied or referenced, that is, the layout sketch in the 3D part is derived from the 2D layout sketch. In an embodiment, the 2D layout sketch is linked to the new part in the 3D assembly such that a change to the 2D layout sketch is reflected in the 3D part. The new 3D part and the corresponding 2D object in the copy of or reference to the 2D layout sketch have origins that are coincident. The 3D part's origin is resolved each time the 3D assembly updates, such that if the design engineer moves the 2D layout sketch object's origin, the new 3D part's origin is updated as well. This maintains the location of the 2D object relative to the corresponding 3D part regardless of how the 2D object is moved or sized in the layout sketch.

Choosing the location for the origin of the new 3D part in the 3D assembly environment entails first transforming the reference to or copy of the 2D layout sketch to align the origin of the 2D object corresponding to the 3D part to the 3D part's origin. The new part's coordinate system is placed coincident with the 2D object coordinate system. Therefore, moving a 2D object in the 2D layout sketch causes the 2D layout sketch origin to move relative to the 3D part origin and 2D object origin, which are coincidently constrained.

The behavior of prior art solutions with regards to aligning the various coordinate systems presents problems for multiple reasons. First, horizontal or vertical sketch relationships/inferences do not function properly with the 2D layout sketch coordinate system at the new 3D part's origin (e.g., the relationships appear to be in arbitrary directions). Moreover, front, top, and right planes and axes are not useful in this setup. Further, view orientation views do not function correctly and drawing views are not displayed correctly. Further, mass property results of the created components are not useful with the 2D layout sketch origin placed at the new parts origin.

In an example embodiment, the present invention applies one or more transformations to the copy of or reference to the 2D layout sketch to superimpose the associated the 2D object origin in the copy of or reference to the 2D layout sketch and the origin of the 3D part corresponding to the 2D object. Alternatively, one or more transformations may be applied to the 3D part to align the origin of the 3D part to the origin of the 2D object in the copy of or reference to the 2D layout sketch. In either case, transformations of the 2D object and the 3D part are synchronized with one another since the coordinate systems of the 2D object and corresponding 3D part are coincident.

Figure 7:
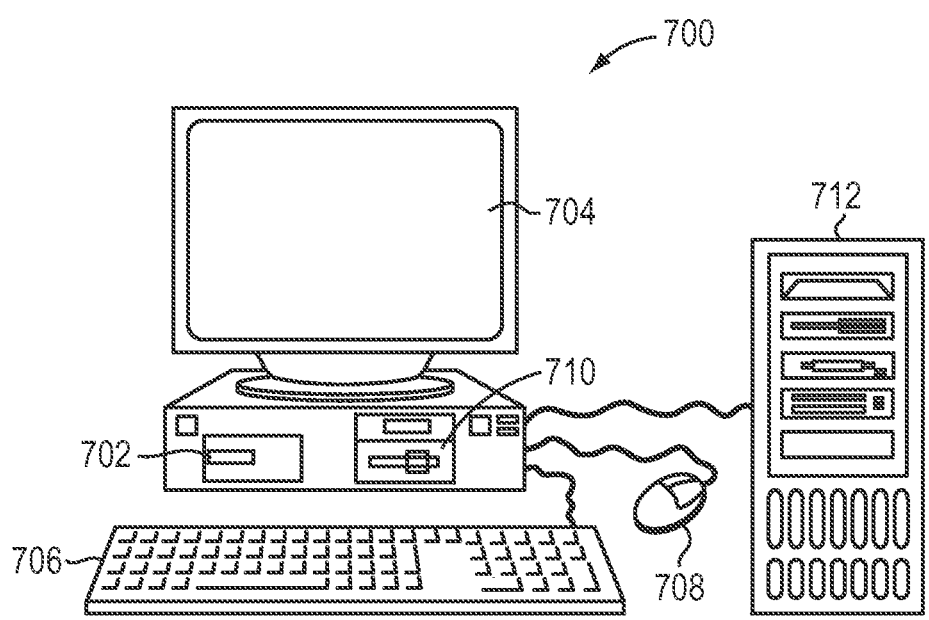
FIG. 7 is a diagram illustrating a computerized modeling system in which embodiments of the present invention are implemented.

Referring now to FIG. 7, a computerized modeling system 700 is shown and includes a CPU 702, a computer monitor 704, a keyboard input device 706, a mouse input device 708, and a storage device 710. The CPU 702, computer monitor 704, keyboard 706, mouse 708, and storage device 710 can include commonly available computer hardware devices. For example, the CPU 702 can include a Pentium-based processor. The mouse 708 may have conventional left and right buttons that the design engineer may press to issue a command to a software program being executed by the CPU 702. As an alternative or in addition to the mouse 708, the computerized modeling system 700 can include a pointing device such as a trackball, touch-sensitive pad, or pointing device and buttons built into the keyboard 706. Those of ordinary skill in the art appreciate that the same results described herein with reference to a mouse device can be achieved using another available pointing device. Appropriate computer hardware platforms that are suitable will become apparent from the discussion herein. For example, a computerized modeling system may have a touchscreen display that enables keyboard and pointing functionality without needing a keyboard or mouse. Such computer hardware platforms are preferably capable of operating the Microsoft Windows® 7, UNIX, Linux, or MAC OS operating systems, or running web Apps that run on web browser. Mobile devices can also support computerized modeling systems. Such devices are capable of operating the mobile operating systems Android™ and iOS®.

Additional computer processing units and hardware devices (e.g., rapid prototyping, video, and printer devices) may be included in the computerized modeling system 700. Furthermore, the computerized modeling system 700 may include network hardware and software thereby enabling communication to a hardware platform 712, and facilitating communication between numerous computer systems that include a CPU and a storage system, among other computer components.

Computer-aided modeling software may be stored on the storage device 710 and loaded into and executed by the CPU 702. The modeling software allows a design engineer to create and modify a 3D model and implements aspects of the invention described herein. The CPU 702 uses the computer monitor 704 to display a 3D model and other aspects thereof as described. Using the keyboard 706 and the mouse 708, the design engineer can enter and modify data associated with the 3D model. The CPU 702 accepts and processes input from the keyboard 706 and mouse 708. The CPU 702 processes the input along with the data associated with the 3D model and makes corresponding and appropriate changes to that which is displayed on the computer monitor 704 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory. Storage devices suitable for tangibly embodying computer program instructions are non-transient and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of computer systems, environments, and/or configurations that may be suitable for use with aspects of the invention include, but are not limited to, personal computers (PCs), server computers, hand-held and laptop devices, multiprocessor systems, microprocessor-based systems, set top boxes, programmable consumer electronics, mobile telephones and mobile operating systems, network PCs, minicomputers, mainframe computers, distributed computing environments that include any of the above systems or devices, and the like. The computer system may have standalone components or workstations, or the computer system may be formed of networked computers by any of known communications networks, processing networks, cloud-based networks, related protocols and the like.

As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network is merely exemplary and in no way limits the scope of the present advancements.

Advantages of the present invention include the ease in which a 2D layout sketch can be converted into a 3D assembly. Further, the present invention can copy motion studies from a 2D layout sketch environment to a 3D environment. Other advantages include utilizing fast and intuitive methods to calculate and provide an optimal origin for each 3D part. These advantages remove the need for a design engineer to manually convert each element of a 2D layout sketch to a corresponding 3D part in a 3D assembly, which saves considerable time and effort. Further advantages include the reduction of the number of mouse clicks to accomplish a task as well as reduced mouse movement.

Time-saving advantages can be achieved by automatically generating 3D part models from a 2D layout sketch of a subassembly or an assembly, rather than requiring the design engineer to manually create multiple 3D parts that correlate to 2D objects depicting parts in a 2D layout sketch. Additionally, the present invention frees the design engineer from the manual process of establishing a relationship between multiple 3D parts and features thereof, for instance by adding mating relationships when such a relationships or a similar relationships are established between 2D objects in a 2D layout sketch.

While this invention has been particularly shown and described with references to example embodiments thereof, those skilled in the art will understand that various changes in form and details may be made therein without departing from the invention encompassed by the appended claims. For example, in most contexts, an assembly may also mean a subassembly. Further, implementations may change the order in which operations are performed. Moreover, depending on the needs of an implementation, particular operations described herein may be implemented as a combined operation, eliminated, added to, or otherwise rearranged. Moreover, although a design engineer usually creates a 2D layout sketch while working in a 2D environment, a 2D layout sketch may be created in a 3D modeling environment, and embodiments described herein also may be implemented in a 3D environment.

What is claimed is:

1. A non-transitory computer-readable storage medium configured to store instructions for creating a model in a three-dimensional (3D) environment, the model representing a real-world object, the instructions, when loaded and executed by a processor, causes the processor to:
given a two-dimensional (2D) sketch comprised of a plurality of sketch entities, automatically create one or more 3D parts in the 3D environment corresponding to respective groupings of the sketch entities in the 2D sketch;
create a derived layout sketch in the 3D environment associated with a first 3D part, wherein the derived layout sketch is one of a reference to and a copy of the 2D sketch;
automatically create a relationship between the first 3D part and a second 3D part by mapping to corresponding respective groupings of sketch entities; and
based on the mapping, automatically update at least one of the first 3D part and the second 3D part in the 3D environment relative to a change to a corresponding respective grouping in the 2D sketch.

2. The non-transitory computer-readable storage medium of claim 1, wherein at least one of the respective groupings of sketch entities consists of a series of sketch entities that create one of a closed contour, an arrangement of continuous lines, and a collection specified by a user.

3. The non-transitory computer-readable storage medium of claim 1, wherein creation of the relationship does not rely on the first 3D part geometry and the second 3D part geometry.

4. The non-transitory computer-readable storage medium of claim 1, wherein creation of the relationship reproduces a constraint between two of the plurality of sketch entities as a mate relationship.

5. The non-transitory computer-readable storage medium of claim 4, wherein reproducing the constraint maps one of: a coincident constraint between two points to a coincident mate between two axes, a parallel mate constraint between two parallel lines to a parallel mate between two planes, a perpendicular mate constraint between two perpendicular lines to a perpendicular mate between two planes, a distance constraint between two lines to a distance mate between two planes, an angular dimension constraint between two lines to an angle mate between two planes, a tangent constraint to a tangential mate, and a concentric constraint to a concentric mate.

6. The non-transitory computer-readable storage medium of claim 1, wherein the derived layout sketch establishes a parametric relationship between the first 3D part and the 2D sketch.

7. The non-transitory computer-readable storage medium of claim 1, wherein the instructions further cause the processor to automatically create a 3D motion study from a 2D motion study established in a 2D computer-aided design environment in which the 2D sketch was created.

8. The non-transitory computer-readable storage medium of claim 1, wherein the instructions further cause the processor to automatically determine an origin for the first 3D part coincident with respective grouping of sketch entities for the first 3D part.

9. A computer-implemented method of creating a three-dimensional (3D) model in a 3D environment, the method comprising:
   given a two-dimensional (2D) sketch of an assembly of parts, and the 2D sketch having sketch entities, automatically creating one or more 3D part models corresponding to respective groupings of the sketch entities in the 2D sketch, wherein each 3D part model represents a real-world object;
   constructing a derived layout sketch and including the derived layout sketch in a first 3D part model, wherein the derived layout sketch is one of a reference between the first 3D part model and the 2D sketch and a copy of the 2D sketch inserted into the 3D environment in which the first 3D part model is being constructed;
   automatically creating a mate relationship between the first 3D part model and a second 3D part model by mapping to a grouping of a first 2D object in the 2D sketch and a second 2D object in the 2D sketch; and
   based on the mapping, automatically updating at least one of the first 3D part model and the second 3D part model relative to a change to the grouping of the first 2D object and the second 2D object in the 2D sketch.

10. The method of claim 9, wherein at least one of the groupings of sketch entities consists of a series of sketch entities that create one of a closed contour, an arrangement of continuous lines, and a collection specified by a user.

11. The method of claim 9, wherein creation of the mate relationship reproduces a constraint between the first 2D object in the 2D sketch and the second 2D object in the 2D sketch.

12. The method of claim 11, wherein reproducing the constraint maps one of: a coincident constraint between two points to a coincident constraint between two axes, a parallel mate constraint between two parallel lines to a parallel mate between two planes, a perpendicular mate constraint between two perpendicular lines to a perpendicular mate between two planes, a distance constraint between two lines to a distance mate between two planes, an angular dimension constraint between two lines to an angle mate between two planes, a tangent constraint to a tangential mate, and a concentric constraint to a concentric mate.

13. The method of claim 9, wherein the derived layout sketch establishes a parametric relationship between the first 3D part model and the 2D sketch.

14. The method of claim 9, further comprising automatically including a motion study established in the 2D sketch in the 3D environment, wherein:
   including the motion study comprises creating one or more motion study objects in the 3D environment; and
   each motion study object has a specification corresponding to a specification of a motion object in the 2D layout sketch.

15. The method of claim 9, further comprising automatically determining an origin for the 3D part model and a coincident origin for a respective grouping of sketch entities for the 3D part model.

16. A computer system for transforming a two-dimensional (2D) sketch representing a real-world assembly of parts to a three-dimensional (3D) assembly of a plurality of 3D parts, the system comprising:
   a processor; and
   a memory with computer code instructions stored thereon, the memory operatively coupled to the processor such that, when executed by the processor, the computer code instructions cause the system to:
   automatically create a first 3D part corresponding to a respective grouping of 2D entities in the 2D sketch;
   automatically create a mate relationship between the first 3D part and a second 3D part by mapping to corresponding respective groupings of 2D entities, wherein the second 3D part corresponds to a respective grouping of 2D entities in the 2D sketch; and
   based on the mapping, automatically update at least one of the first 3D part and the second 3D part relative to a change to a corresponding respective grouping of 2D entities in the 2D sketch.

17. The computer system of claim 16, wherein creation of the mate relationship reproduces a constraint between two of the respective groupings of 2D entities.

18. The computer system of claim 17, wherein reproducing the constraint maps one of: a coincident constraint between two points to a coincident constraint between two axes, a parallel mate constraint between two parallel lines to a parallel mate between two planes, a perpendicular mate constraint between two perpendicular lines to a perpendicular mate between two planes, a distance constraint between two lines to a distance mate between two planes, an angular dimension constraint between two lines to an angle mate between two planes, a tangent constraint to a tangential mate, and a concentric constraint to a concentric mate.

19. The computer system of claim 16, wherein association between the first 3D part and a derived sketch establishes a parametric relationship between the first 3D part and the 2D sketch.

20. The computer system of claim 16, wherein the computer code instructions further cause the system to automatically create a motion study to visualize a motion in the 3D assembly, wherein the mate relationship determines the motion.

* * * * *